(12) United States Patent
Tsujioka et al.

(10) Patent No.: US 8,841,034 B2
(45) Date of Patent: Sep. 23, 2014

(54) ELECTROLYTE FOR ELECTROCHEMICAL DEVICE, ELECTROLYTE SOLUTION USING SAME, AND NON-AQUEOUS ELECTROLYTE BATTERY

(75) Inventors: Shoichi Tsujioka, Iruma-gun (JP); Toshinori Mitsui, Ube (JP); Yuki Kondo, Ube (JP); Aiichiro Fujiwara, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 291 days.

(21) Appl. No.: 13/257,425

(22) PCT Filed: Mar. 23, 2010

(86) PCT No.: PCT/JP2010/054912
§ 371 (c)(1),
(2), (4) Date: Sep. 19, 2011

(87) PCT Pub. No.: WO2010/122867
PCT Pub. Date: Oct. 28, 2010

(65) Prior Publication Data
US 2012/0028132 A1 Feb. 2, 2012

(30) Foreign Application Priority Data
Apr. 22, 2009 (JP) ................................. 2009-103515

(51) Int. Cl.
*H01M 10/052* (2010.01)
*H01M 10/056* (2010.01)
*H01M 10/0567* (2010.01)
*H01M 10/0568* (2010.01)
*H01M 10/0569* (2010.01)

(52) U.S. Cl.
CPC ............ *H01M 10/052* (2013.01); *Y02E 60/122* (2013.01); *H01M 10/0569* (2013.01); *H01M 10/0567* (2013.01); *H01M 10/0568* (2013.01)
USPC ...... 429/323; 429/231.95; 429/324; 429/338; 429/342

(58) Field of Classification Search
USPC ..................... 429/338, 231.95, 323, 324, 342
See application file for complete search history.

(56) References Cited

U.S. PATENT DOCUMENTS

| 7,172,834 | B1 | 2/2007 | Jow et al. |
| 2006/0068295 | A1 | 3/2006 | Xu et al. |
| 2008/0102376 | A1 | 5/2008 | Kato et al. |
| 2008/0226989 | A1 | 9/2008 | Angell et al. |
| 2010/0004461 | A1 | 1/2010 | Ignatyev et al. |

FOREIGN PATENT DOCUMENTS

| EP | 1 905 739 A1 | 4/2008 |
| JP | 2000-123867 A | 4/2000 |
| JP | 2000-516930 A | 12/2000 |
| JP | 2004-31079 A | 1/2004 |
| JP | 3671936 B2 | 4/2005 |
| WO | WO 02/085919 A1 | 10/2002 |
| WO | WO 2008/092489 A1 | 8/2008 |
| WO | WO 2011/031401 A2 | 3/2011 |

OTHER PUBLICATIONS

Gerken et al., "Syntheses and Structures of the Oxide Fluorides of the Main-Group and Transition Metal Elements." in: Nakajima et al., Advanced Inorganic Fluorides: Synthesis, Characterization and Applications, 2000, Elsevier Science, 117-174.*
Yukio Sasaki et al., "Application of Lithium Organoborate with Salicylic Ligand to Lithium Battery Electrolyte", Journal of the Electrochemical Society, 2001, pp. A999-A1003, vol. 148, No. 9.
International Search Report including English language translation dated Jun. 22, 2010 (Three (3) pages).
PCT/ISA/237 Form (Three (3) pages).
Christopher L. Campion et al., "Suppression of Toxic Compounds Produced in the Decomposition of Lithium-Ion Battery Electrolytes", Electrochemical and Solid-State Letters, Jan. 1, 2004, pp. A194-A197, vol. 7, No. 7, The Electrochemical Society, Inc. (XP55015947).
The Extended European Search Report dated Aug. 20, 2012 (Ten (10) pages).

* cited by examiner

*Primary Examiner* — Sean P Cullen
(74) *Attorney, Agent, or Firm* — Crowell & Moring LLP

(57) ABSTRACT

An electrolyte for an electrochemical device according to the present invention has a chemical structure formula represented by a general formula (1):

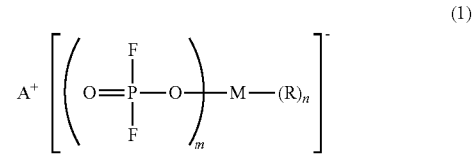

where M is a group 13 or 15 element of the periodic table; $A^+$ is an alkali metal ion or an onium ion; m is a number of 1-4 when M is a group 13 element, and is a number of 1-6 when M is a group 15 element; n is a number of 0-3 when M is a group 13 element, and is a number of 0-5 when M is a group 15 element; R is a halogen atom, a $C_1$-$C_{10}$ halogenated alkyl group, a $C_6$-$C_{20}$ aryl group, or a $C_6$-$C_{20}$ halogenated aryl group; a hydrogen atom in R may be replaced with a specific substituent; and a carbon atom in R may be replaced by a nitrogen atom, a sulfur atom or an oxygen atom.

24 Claims, No Drawings

ELECTROLYTE FOR ELECTROCHEMICAL DEVICE, ELECTROLYTE SOLUTION USING SAME, AND NON-AQUEOUS ELECTROLYTE BATTERY

TECHNICAL FIELD

This invention relates to an electrolyte to be used for an electrochemical device such as a lithium battery, a lithium ion battery, an electric double layer capacitor or the like, and an electrolyte solution for a nonaqueous electrolyte battery and a nonaqueous electrolyte battery using this.

BACKGROUND ART

With progression of mobile instruments in recent years, development of electrochemical devices such as batteries and capacitors using electrochemical phenomena has been actively carried out to obtain power sources for the instruments. Additionally, as electrochemical devices other than power sources, an electrochromic display (ECD) making change in color under electrochemical reaction is given.

Each of these electrochemical devices is generally constituted of a pair of electrodes and an ion conductive body filling a space between the electrodes. As this ion conductive body, one prepared by dissolving salts (AB) including cation ($A^+$) and anion ($B^-$), called electrolyte, in a solvent, a polymer or a mixture thereof is used. By dissolving this electrolyte, it dissociates into cation and anion thereby making an ion conduction. In order to obtain an ion conductivity required for the devices, it is necessary that a sufficient amount of the electrolyte is dissolved in the solvent or the polymer. In practice, there are many cases of using as the solvent ones other than water, in which electrolytes having sufficient solubilities to such organic solvents or polymers can be presently limited to several kinds. For example, only $LiClO_4$, $LiPF_6$, $LiBF_4$, $LiAsF_6$, $LiN(CF_3SO_3)_2$ and $LiCF_3SO_3$ are used for the electrolyte of a lithium ion battery. The section of cation is almost decided by a device like lithium ion of a lithium battery, whereas the section of anion is usable if the condition of having a high solubility is satisfied.

The most appropriate electrolytes for the respective applications have been searched under a circumstance where a wide variety of application ranges are required for the devices; however, searching the most appropriate ones have reached a limit because kinds of anion are presently little. Additionally, present electrolytes have a variety of problems, and therefore electrolytes having a new anion section has been required. Specifically, $ClO_4$ ion is explosive and $AsF_6$ ion has a toxicity, and therefore they cannot be used from the viewpoint of safety. $LiN(CF_3S_2)$ and $LiCF_3SO_3$ are difficult to be used because they corrode a collector of aluminum in a condition where an electric potential is applied. Only $LiPF_6$ put into practical use also has the problems in heat resistance and in hydrolysis resistance.

Some compounds have been hitherto proposed as electrolytes having a new anion section. For example, lithium bis(biphenyldiolato) borate has been proposed as a new electrolyte (see Patent Citation 1); however, it is problematic because of being insufficient in solubility to nonaqueous organic solvent and oxidation resistance in the battery. Additionally, lithium bis(salicylato) borate and one in which an electron attractive Cl is bonded as a substituent to a ligand of lithium bis(salicylato) borate have been proposed as new electrolytes; however, lithium bis(salicylato) borate is insufficient in ion conductivity and oxidation resistance, and the Cl-substituted derivative is problematic to be excessively low in solubility though it is improved in ion conductivity and oxidation resistance.

Additionally, concerning battery as an electrochemical device, attention has been paid in recent years on small-size electricity storage systems for high energy density applications such as intelligence instrument and communication equipment such as personal computer, video camera, digital still camera, mobile phone and the like, and on large-size electricity storage systems for power applications such as electric vehicle, hybrid vehicle, auxiliary power source for fuel cell vehicle, power storage and the like. One proposed for them is lithium ion battery, lithium battery, lithium ion capacitor or the like which has been actively developed.

Many of these nonaqueous electrolyte batteries have been put into practical use; however, these cannot be satisfied in a variety of applications from the viewpoint of durability, in which they are highly deteriorated particularly at a temperature of not lower than 45° C. and therefore problematic for applications of being used for a long period of time and in a site high in temperature, for example, automotive vehicle.

In general, in these nonaqueous electrolyte batteries, a nonaqueous electrolytic solution or a nonaqueous electrolytic solution which is formed into a quasi-solid state with a gelating agent is used as an ion conductive body. The configuration of it is as follows: One kind or a mixture solvent of several kinds selected from aprotic ethylene carbonate, propylene carbonate, dimethyl carbonate, diethyl carbonate, ethylmethyl carbonate and the like are used as a solvent, and lithium salt such as $LiPF_6$, $LiBF_4$, $(CF_3SO_2)_2NLi$, $(C_2F_5SO_2)_2NLi$ or the like is used as a solute.

As measures for improving the cycle characteristics, high temperature storage stability and durability of a nonaqueous electrolyte battery, optimization of various constituting elements of the battery including active material of a positive electrode and a negative electrode has been hitherto studied. Techniques relating to nonaqueous electrolytic solution are also no exception, in which it has been proposed to suppress deterioration of the electrolytic solution at the surfaces of the active positive and negative electrodes due to decomposition of the electrolytic solution by using a variety of additives. It has been proposed to suppress the deterioration and improve battery characteristics, for example, by adding vinylene carbonate (see Patent Citation 2) to an electrolytic solution or by adding cyclohexyl benzene or tetrahydronaphthalene (see Patent Citation 3) to an electrolytic solution. However, it is insufficient in effect to suppress the deterioration at a high temperature of not lower than 45° C., accompanying a problem that a resistance within the battery rises. Accordingly, a further improvement in characteristics of the electrolytic solution has been desired.

PRIOR ART CITATIONS

Patent Citation

Patent Citation 1: Japanese PCT Publication No. 2000-516930
Patent Citation 2: Japanese Patent Provisional Publication No. 2000-123867
Patent Citation 3: Japanese Patent No. 3671936

Non-Patent Citation

Non-Patent Citation 1: J. Electrochem. Soc., 148(9), A999 (2001)

SUMMARY OF THE INVENTION

Problems to be Solved by the Invention

Appearance of a new electrolyte has been required in order to cope with the above-discussed various electrochemical devices. An object of the present invention is to find a new electrolyte having characteristics for electrochemical devices, and to provide an excellent electrolytic solution for a nonaqueous electrolyte battery and a nonaqueous electrolyte battery using the new electrolyte.

Means for Solving Problems

In view of such problems, the present inventors have made eager studies. As a result, they have found an electrolyte having new chemically structural characteristics and found an excellent electrolytic solution for a nonaqueous electrolyte battery and a nonaqueous electrolyte battery using the new electrolyte, thereby reaching the present invention.

Specifically the present invention is to provide an electrolyte for an electrochemical device, characterized by having a chemical structure formula represented by a general formula (1),

[Chem. 2]

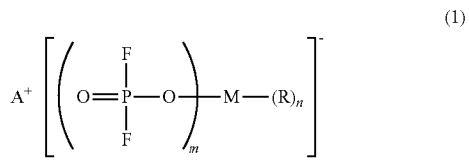

where M is a group 13 or 15 group element of the periodic table; $A^+$ is an alkali metal ion or an onium ion; m is a number of 1-4 when M is a group 13 element, and is a number of 1-6 when M is a group 15 element; n is a number of 0-3 when M is a group 13 element, and is a number of 0-5 when M is a group 15 element; and R is a halogen atom, a $C_1$-$C_{10}$ halogenated alkyl group, a $C_6$-$C_{20}$ aryl group, a $C_6$-$C_{20}$ halogenated aryl group. The electrolyte may have a chemical structure formula obtained by introducing, in place of a hydrogen atom in the structure formula represented by the formula (1), a halogen atom, a chain or cyclic alkyl group, an aryl group, an alkenyl group, an alkoxy group, an aryloxy group, a sulfonyl group, an amino group, a cyano group, a carbonyl group, an acyl group, an amide group or a hydroxyl group, or a chemical structure formula obtained by introducing, in place of a carbon atom in the structure represented by the formula (1), a nitrogen atom, a sulfur atom or an oxygen atom, wherein the n-number of Rs are independent from each other and may be the same as or different from each other.

Further, the present invention is to provide an electrolyte for an electrochemical device, characterized by having a chemical structure formula in which M is either B or P; $A^+$ is one cation selected from the group consisting of a Li ion, a Na ion, a K ion and a quaternary alkylammonium ion; and R is a functional group of a fluorine atom, a phenyl group or a pentafluorophenyl group, or an electrolyte for an electrochemical device, characterized by being a compound in which an anion section in the general formula (1) is at least one compound selected from the group consisting of $[BF_3(PO_2F_2)]^-$, $[BF_2(PO_2F_2)_2]^-$, $[BF(PO_2F_2)_3]^-$, $[B(PO_2F_2)_4]^-$, $[PF_5(PO_2F_2)]^-$, $[PF_4(PO_2F_2)_2]^-$, $[PF_3(PO_2F_2)_3]^-$, $[PF_2(PO_2F_2)_4]^-$, $PF(PO_2F_2)_5]^-$, $[P(PO_2F_2)_6]^-$, $[B(C_6H_5)_3(PO_2F_2)]^-$ and $[B(C_6F_5)_3(PO_2F_2)]^-$.

Further, the present invention is to provide an electrolytic solution for a nonaqueous electrolyte battery, characterized in that a nonaqueous organic solvent contains the above-mentioned electrolyte for an electrochemical device, or by an electrolytic solution for a nonaqueous electrolyte battery, including a nonaqueous organic solvent and a solute, wherein the above-mentioned electrolyte for an electrochemical device is contained as an additive.

Additionally, the present invention is to provide an electrolytic solution for a nonaqueous electrolyte battery, characterized in that the nonaqueous organic solvent is ethylene carbonate, propylene carbonate, diethyl carbonate, dimethyl carbonate or ethylmethyl carbonate, or in that an addition concentration of the above-mentioned electrolyte for an electrochemical device is within a range of from 0.01 to 10.0 mass %, or in that the solute is $LiPF_6$, $LiBF_4$, $(CF_3SO_2)_2NLi$ or $(C_2F_5SO_2)_2NLi$.

Further, the present invention is to provide a nonaqueous electrolyte battery characterized by including at least a positive electrode, a negative electrode formed of lithium or of a negative electrode material which is possible to occlude or release lithium, and an electrolytic solution, wherein the electrolytic solution includes the above-mentioned electrolytic solution for a non-aqueous electrolyte battery.

Effects of the Invention

According to the present invention, a new electrolyte coping with an electrochemical device can be provided.

MODES FOR CARRYING OUT THE INVENTION

Hereinafter, the present invention will be discussed in detail.

Here, specific examples of compounds represented by the general formula (1) of the present invention will be indicated below.

The examples include $LiBF_3(PO_2F_2)$, $LiBF_2(PO_2F_2)_2$, $LiBF(PO_2F_2)_3$, $LiB(PO_2F_2)_4$, $LiB(CF_3)_3(PO_2F_2)$, $LiB(C_2F_5)_3(PO_2F_2)$, $LiB(C_6H_5)_3(PO_2F_2)$, $LiB(C_6F_5)_3(PO_2F_2)$, $LiPF_5(PO_2F_2)$, $LiPF_4(PO_2F_2)_2$, $LiPF_3(PO_2F_2)_3$, $LiPF_2(PO_2F_2)_4$, $LiPF(PO_2F_2)_5$, $LiP(PO_2F_2)_6$, $LiP(CF_3)_3F_2(PO_2F_2)$, and the like.

For example, the chemical structure formula of $LiB(C_6H_5)_3(PO_2F_2)$ is represented by the following formula:

[Chem. 3]

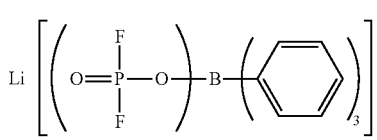

The chemical structure formula of $LiB(C_6F_5)_3(PO_2F_2)$ is represented by the following formula:

[Chem. 4]

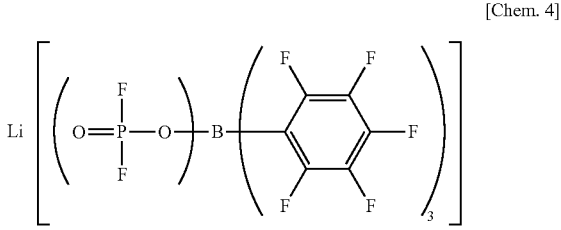

The chemical structure formula of $LiB(CF_3)_3(PO_2F_2)$ is represented by the following formula:

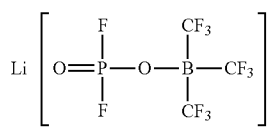

[Chem. 5]

The chemical structure formula of LiB(C$_2$F$_5$)$_3$(PO$_2$F$_2$) is represented by the following formula:

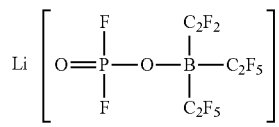

[Chem. 6]

The chemical structure formula of LiP(CF$_3$)$_3$F$_2$(PO$_2$F$_2$) is represented by the following formula:

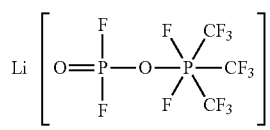

[Chem. 7]

as shown.

Here, lithium ion is given as A$^-$; however, examples of cations other than lithium ion to be used include sodium ion, potassium ion, cesium ion, silver ion, copper ion, tetrabutylammonium ion, tetraethylammonium ion, tetramethylammonium ion, triethylmethylammonium ion, triethylammonium ion, pyridinium ion, imidazolium ion, hydrogen ion, tetraethylphosphonium ion, tetramethylphosphonium ion, tetraphenylphosphonium ion, triphenylsulfonium ion, triethylsulfonium ion, and the like.

From the viewpoint of playing a role of helping ion conduction in the electrochemical device, lithium ion, sodium ion, potassium ion, quaternary alkylammonium ion are preferable.

The electrolyte for an electrochemical device, according to the present invention takes an ionic metal complex structure, in which M as the center of the structure is selected from the group 13 elements or the group 15 elements of the periodic table. Al, B, V, Ti, Si, Zr, Ge, Sn, Cu, Y, Zn, Ga, Nb, Ta, Bi, P, As, Sc, Hf or Sb is preferable. B or P is more preferable. It is possible to use a variety of elements as the center M; however, synthesis is relatively easy in case of using Al, B, V, Ti, Si, Zr, Ge, Sn, Cu, Y, Zn, Ga, Nb, Ta, Bi, P, As, Sc, Hf or Sb, and additionally excellent characteristics in various aspects such as low toxicity, stability and cost are exhibited in addition to easiness in synthesis in case of using B or P.

Next, discussion will be made on the section of a ligand as a feature of the electrolyte (ionic metal complex) for an electrochemical device, according to the present invention. Hereafter, the organic or inorganic section bonded to M is called a ligand.

R in the general formula (1) is selected from a halogen atom, a C$_1$-C$_{10}$ halogenated alkyl group, a C$_6$-C$_{20}$ aryl group, or a C$_6$-C$_{20}$ halogenated aryl group, in which a halogen atom, a chain or cyclic alkyl group, an aryl group, an alkenyl group, an alkoxy group, an aryloxy group, a sulfonyl group, an amino group, a cyano group, a carbonyl group, an acyl group, an amide group or a hydroxyl group is introduced in place of a hydrogen atom in the structure of the general formula (1) to give a structure, or a nitrogen atom, a sulfur atom or an oxygen atom is introduced in place of a carbon atom in the structure of the general formula (1) to give a structure. Further, the n-number of Rs may be independent from each other and may be the same as or different from each other. Additionally, the halogen atom to be used in R is particularly preferably fluorine so that the electrolyte can be improved in dissociation degree owing to its high electron attractiveness and small-sized thereby to improve a mobility, thus extremely improving an ion conductivity.

PO$_2$F$_2$ described as another kind of ligand in the general formula (1) is an electron attractive ligand which exhibits the greatest feature of the present invention. This ligand is high in electron attractiveness under the effects of fluorine and oxygen bonded to phosphorus though it is relatively compact. Under this effect, the electrolyte can be improved in dissociation degree and small-sized thereby improving the mobility, thus improving the ion conductivity. Besides, the electrolyte is high in withstand voltage characteristics, so that a life of a battery using this electrolyte is prolonged.

Additionally, constants m and n relating to the number of the ligands discussed hereinbefore are decided by the kind of M as the center, in which it is preferable that m is a number of 1-4 when M is a group 13 element, and is a number of 1-6 when M is a group 15 element, and n is a number of 0-3 when M is a group 13 element, and is a number of 0-5 when M is a group 15 element.

Additionally, a synthetic method for the electrolyte for an electrochemical device, according to the present invention is not particularly limited, in which, for example in case of LiBF$_3$(PO$_2$F$_2$), a synthesis can be made by a method of allowing BF$_3$ and equimolar LiPO$_2$F$_2$ to react with each other in a nonaqueous solvent or by a method of allowing LiBF4 and equimolar LiPO$_2$F$_2$ to react with each other, removing LiF. In case of LiBF$_2$(PO$_2$F$_2$), a synthesis can be made by a method of allowing BF$_3$ and double-molar LiPO$_2$F$_2$ to react with each other in a nonaqueous solvent, or by a method of allowing LiBF$_4$ and double-molar LiPO$_2$F$_2$ to react with each other in a nonaqueous solvent, removing LiF. In case of LiPF$_5$(PO$_2$F$_2$), a synthesis can be made by a method of allowing PF$_5$ and equimolar LiPO$_2$F$_2$ to react with each other in a nonaqueous solvent.

In case of constituting an electrochemical device by using the electrolyte for an electrochemical device, according to the present invention, basic constituting elements of the device include an ion conductive body, a negative electrode, a positive electrode, a collector, a separator, a container, and the like.

As the ion conductive body, a mixture of the electrolyte and the nonaqueous solvent or a mixture of an electrolyte and a polymer is used. If the nonaqueous solvent is used, the ion conductive body is generally called a nonaqueous electrolytic solution; and if the polymer is used, the ion conductive body is generally called a polymer solid electrolyte. The polymer solid electrolyte may include a nonaqueous solvent as a plasticizer.

Additionally, an electrochemical device using the nonaqueous solvent in the ion conductive body and using lithium or the negative electrode material which is possible to occlude or release lithium, in the negative electrode is called a nonaqueous electrolyte battery.

The nonaqueous solvent is not particularly limited as far as it is an aprotic solvent which can dissolve the electrolyte for an electrochemical device, according to the present invention. For example, carbonates, esters, ethers, lactones, nitriles, amides, sulfones, and the like can be used as the nonaqueous solvent. Additionally, not only a single solvent but also a mixture solvent of two or more kinds can be used. Specific examples of the nonaqueous solvent include propylene carbonate, ethylene carbonate, butylene carbonate, diethyl carbonate, diethyl carbonate, dimethyl carbonate, methylethyl carbonate, methyl acetate, methyl propionate, dimethoxyethane, diethyl ether, acetonitrile, propionitrile, tetrahydrofuran, 2-methyltetrahydrofuran, dioxane, nitromethane, N,N-dimethylformamide, dimethylsulfoxide, sulfolane, γ-butyrolactone, γ-valerolactone, and the like. Additionally, ionic liquid can be also given as the nonaqueous solvent. Of these, propylene carbonate, ethylene carbonate, diethyl carbonate, dimethyl carbonate and methylethyl carbonate are preferable from the viewpoints of their electrochemical stability against their oxidation and reduction and chemical stability to heat or relating to their reaction with a solute.

The polymer to be mixed with the electrolyte is not particularly limited as far as it is an aprotic polymer which can dissolve the compound. Examples of the polymer include a polymer having polyethylene oxide at its main chain or side chain, homopolymer or copolymer of polyvinylidene fluoride, methacrylic acid ester polymer, polyacrylonitrile, and the like. In case that a plasticizer is added to these polymers, the above-mentioned aprotic nonaqueous solvent can be used. A concentration of the electrolyte for an electrochemical device, according to the present invention in the ion conductive body is not particularly limited, in which a lower limit is not less than 0.5 mol/L, preferably not less than 0.7 mol/L and more preferably not less than 0.9 mol/L, and an upper limit is not more than 2.5 mol/L, preferably not more than 2.0 mol/L and more preferably not more than 1.5 mol/L. If the concentration is less than 0.5 mol/L, an ion conductivity is lowered thereby degrading cycle characteristics and output characteristics of the nonaqueous electrolyte battery. If the concentration exceeds 2.5 mol/L, there is a possibility that a viscosity of the electrolytic solution for a nonaqueous electrolyte battery rises thereby similarly lowering an ion conductivity thereby degrading cycle characteristics and output characteristics of the nonaqueous electrolyte battery.

In case that the electrolyte for an electrochemical device, according to the present invention is used as the additive in the electrolytic solution for a nonaqueous electrolyte battery, the kind of the solute of the electrolytic solution for a nonaqueous electrolyte battery is not particularly limited, so that an arbitrary lithium salt can be used. Specific examples include electrolyte lithium salts represented by $LiPF_6$, $LiBF_4$, $LiClO_4$, $LiAsF_6$, $LiSbF_6$, $LiCF_3SO_3$, $LiN(SO_2CF_3)_2$, $LiN(SO_2C_2F_5)_2$, $LiN(SO_2CF_3)(SO_2C_4F_9)$, $LiC(SO_2CF_3)_3$, $LiPF_3(C_3F_7)_3$, $LiB(CF_3)_4$, $LiBF_3(C_2F_5)$, and the like. These solutes may be used singly with one kind or in arbitrary combinations of two or more kinds upon being mixed in arbitrary ratios according to the purposes. Of these, $LiPF_6$, $LiBF_4$, $(CF_3SO_2)_2NLi$ and $(C_2F_5SO_2)_2NLi$ are preferable from the viewpoints of energy density, output characteristics, life and the like for a battery.

A concentration of these solutes is not particularly limited, in which a lower limit is not less than 0.5 mol/L, preferably not less than 0.7 mol/L and more preferably not less than 0.9 mol/L, and an upper limit is not more than 2.5 mol/L, preferably not more than 2.0 mol/L and more preferably not more than 1.5 mol/L. If the concentration is less than 0.5 mol/L, an ion conductivity is lowered thereby degrading cycle characteristics and output characteristics of the nonaqueous electrolyte battery. If the concentration exceeds 2.5 mol/L, there is a possibility that a viscosity of the electrolytic solution for a nonaqueous electrolyte battery rises thereby similarly lowering an ion conductivity thereby degrading cycle characteristics and output characteristics of the nonaqueous electrolyte battery.

An addition concentration of the electrolyte for an electrochemical device, according to the present invention in case of that the electrolyte is used in the electrolytic solution for a nonaqueous electrolyte battery is not less than 0.01 mass %, preferably not less than 0.03 mass % and more preferably not less than 0.05 mass %, and not more than 10.0 mass %, preferably not more than 5.0 mass % and more preferably not more than 2.0 mass %. If the addition concentration is less than 0.01 mass %, the effects of improving durabilities such as cycle characteristics and high temperature storage stability of the battery and of suppressing a rise in internal resistance of the battery cannot be sufficiently obtained. If the addition concentration exceeds 10.0 mass %, the viscosity of the electrolytic solution excessively rises thereby impeding movement of ions (lithium ions in case of a lithium ion battery), thus providing the possibility of resulting in lowering in battery performance.

Further, as far as the gist of the present invention is not degraded, generally used additives may be added in an arbitrary ratio to the electrolytic solution for a nonaqueous electrolyte battery, according to the present invention. Specific examples of the additives include cyclohexylbenzene, biphenyl, t-butylbenzene, vinylene carbonate, vinylethylene carbonate, difluoro anisole, fluoroethylene carbonate, propane sultone, dimethylvinylene carbonate and the like which are compounds having an overcharge preventing effect, a negative electrode film forming effect and a positive electrode preventing effect. Additionally, the electrolytic solution for a nonaqueous electrolyte battery may be used upon being put into a quasi-solid state with a gelling agent or a cross-linking agent, for example, in case that it is used for a nonaqueous electrolyte battery called a lithium polymer battery.

A negative electrode material is not particularly limited, in which a lithium metal which can occlude or release lithium, an alloy or an intermetallic compound of lithium and other metals, a variety of carbon materials, artificial graphite, natural graphite, a metal oxide, a metal nitride, activated carbon, an electrically conductive polymer, and the like are used.

A positive electrode material is not particularly limited. In case of a lithium battery or a lithium ion battery, for example, the following materials are used as the positive electrode material: Transition metal complex oxide containing lithium such as $LiCoO_2$, $LiNiO_2$, $LiMnO_2$, $LiMn_2O_4$, and the like; such lithium-containing transition metal complex oxide containing a plurality of transition metals such as Co, Mn, Ni and the like in a mixed state; such lithium-containing transition metal complex oxide whose transition metal is partly substituted by metals other than the transition metals; phosphoric acid compounds of transition metals, such as $LiFePO_4$, $LiCoPO_4$, $LiMnPO_4$ and the like which are called olivine; oxides such as $TiO_2$, $V_2O_5$, $MoO_3$, and the like; sulfides such as $TiS_2$, FeS and the like; electrically conductive polymers such as polyacetylene, polyparaphenylene, polyaniline, polypyrrole and the like; activated carbon; polymers which generate radical, carbon materials; and the like.

To the positive and negative electrode materials, acetylene black, Ketchen Black, carbon fiber or graphite is added as an electrically conductive material; and polytetrafluoroethylene, polyvinylidene fluoride, SBR resin or the like is added as a binder, followed by forming into the shape of a sheet, thereby obtaining an electrode sheet which can be used.

As a separator for preventing contact between the positive electrode and the negative electrode, a nonwoven fabric or a porous sheet formed of polypropylene, polyethylene, paper, glass fiber or the like is used.

With the above respective constituting elements, the electrochemical device in the shape of a coin, a cylinder, a rectangle, an aluminum laminate sheet or the like is assembled.

Hereinafter, the present invention will be specifically discussed with reference to Examples, in which the present invention is not limited to such Examples.

EXAMPLE 1

Boron trifluoride dimethyl ether complex ($(C_2H_5)_2O.BF_3$) in an amount of 2.4 g was dissolved in 7.5 g of dimethyl carbonate in a glove box having a dew point of −50° C. Subsequently, 1.9 g of lithium difluorophosphate ($LiPO_2F_2$) was added to this solution, and agitation was made at 25° C. for 2 hours. Thereafter, by-product diethyl ether was removed under a reduced pressure condition of 2600 Pa at 35° C., thereby obtaining 5.4 g of a dimethyl carbonate solution containing 55.5 wt % of $LiBF_3(PO_2F_2)$. The obtained product was $LiBF_3(PO_2F_2)$ and confirmed by NMR spectrum. NMR spectrum is shown below.

$^{19}$F-NMR (trichlorofluoromethane reference, solvent: CD3CN)
−83.1 ppm (1F, d, J=961.3 Hz)
−85.6 ppm (1F, d, J=961.3 Hz)
−146.7 ppm (3F, s)
$^{11}$B-NMR ($B(OCH_3)_3$ reference, solvent: CD3CN)
−19.9 ppm (s)

EXAMPLE 2

An electrolytic solution having a concentration of 1.0 mol/L was prepared by using $LiBF_3(PO_2F_2)$ obtained in Example 1 as an electrolyte. At this time, a mixture solvent (EC:EMC=1:2) of ethylene carbonate (EC) and ethylmethyl carbonate (EMC) was used as a solvent.

By using this electrolytic solution, a cell was produced by using $LiCoO_2$ as a positive electrolyte material while by using graphite as a negative electrolyte material. The cell actually underwent a charge and discharge test for a battery. A cell for test was produced as discussed below.

To 90 parts by mass of $LiCoO_2$ powder, 5 parts by mass of polyvinylidene fluoride (PVDF) as a binder and 5 parts by mass of acetylene black as an electrically conductive material were mixed, and then N-methylpyrrolidone were added thereby forming a paste. This paste was applied onto an aluminum foil and dried thereby to obtain a positive electrode body for a test. Additionally, to 90 parts by mass of graphite powder, 10 parts by mass of polyvinylidene fluoride (PVDF) was mixed as a binder, and then N-methylpyrrolidone was added, thereby forming a slurry. This slurry was applied onto a copper foil and dried at 150° C. for 12 hours thereby obtaining a negative electrode body for the test. Then, a separator formed of polyethylene was impregnated with the electrolytic solution thereby assembling a coin-type cell.

By using the cell produced by the above-discussed method, the charging and discharging test was carried out at a circumstance temperature of 25° C. Both charging and discharging were made at a current density of 0.35 mA/cm$^2$, in which a charging and discharging cycle was repeated, the cycle including a charging of maintaining 4.2 V for 1 hour after reaching to 4.2 V, and a discharging to 3.0 V. An initial discharge capacity was 350 mAh/g in mass standard of the negative electrode. A discharge capacity maintaining rate after 500 cycles was 86%, the discharge capacity maintaining rate being represented by a percentage of the discharge capacity after 500 cycles relative to the initial discharge capacity.

EXAMPLE 3

An electrolytic solution having a concentration of 1.0 mol/L was prepared by using $LiBF_2(PO_2F_2)_2$ as an electrolyte. At this time, a mixture solvent (EC:EMC=1:2) of ethylene carbonate (EC) and ethylmethyl carbonate (EMC) was used as a solvent.

By using this electrolytic solution, a cell was produced by using $LiCoO_2$ as a positive electrolyte material while by using graphite as a negative electrolyte material, similarly in Example 2. The cell actually underwent a charge and discharge test for a battery.

By using the produced cell, the charging and discharging test was carried out at a circumstance temperature of 25° C. Both charging and discharging were made at a current density of 0.35 mA/cm$^2$, in which a charging and discharging cycle was repeated, the cycle including a charging of maintaining 4.2 V for 1 hour after reaching to 4.2 V, and a discharging to 3.0 V. An initial discharge capacity was 362 mAh/g in mass standard of the negative electrode. A discharge capacity maintaining rate after 500 cycles was 88%, the discharge capacity maintaining rate being represented by a percentage of the discharge capacity after 500 cycles relative to the initial discharge capacity.

EXAMPLE 4

An electrolytic solution having a concentration of 1.0 mol/L was prepared by using $LiPF_5(PO_2F_2)$ as an electrolyte. At this time, a mixture solvent (EC:EMC=1:2) of ethylene carbonate (EC) and ethylmethyl carbonate (EMC) was used as a solvent.

By using this electrolytic solution, a cell was produced by using LiCoO2 as a positive electrolyte material while by using graphite as a negative electrolyte material, similarly in Example 2. The cell actually underwent a charge and discharge test for a battery.

By using the produced cell, the charging and discharging test was carried out at a circumstance temperature of 25° C. Both charging and discharging were made at a current density of 0.35 mA/cm$^2$, in which a charging and discharging cycle was repeated, the cycle including a charging of maintaining 4.2 V for 1 hour after reaching to 4.2 V, and a discharging to 3.0 V. An initial discharge capacity was 361 mAh/g in mass standard of the negative electrode. A discharge capacity maintaining rate after 500 cycles was 92%, the discharge capacity maintaining rate being represented by a percentage of the discharge capacity after 500 cycles relative to the initial discharge capacity.

EXAMPLE 5

Into a mixture solution of ethylene carbonate and ethylmethyl carbonate, having a volume ratio of 1:2, 1.2 mol/L of $LiPF_6$ was added as a solute and $LiBF_3(PO_2F_2)$ was added as the compound of the general formula (1) so as to become 3.0 mass %, thereby preparing a electrolytic solution of a non-aqueous electrolyte battery.

By using this electrolytic solution, a cell was produced by using LiCoO2 as a positive electrolyte material while by using graphite as a negative electrolyte material. The cell actually underwent a charge and discharge test for a battery. A cell for a test was produced as discussed below.

To 90 parts by mass of $LiCoO_2$ powder, 5 parts by mass of polyvinylidene fluoride (PVDF) as a binder and 5 parts by mass of acetylene black as an electrically conductive material were mixed, and then N-methylpyrrolidone were added thereby forming a paste. This paste was applied onto an aluminum foil and dried thereby to obtain a positive electrode body for a test. Additionally, to 90 parts by mass of graphite powder, 10 parts by mass of polyvinylidene fluoride (PVDF) was mixed as a binder, and then N-methylpyrrolidone was added, thereby forming a slurry. This slurry was applied onto a copper foil and dried at 150° C. for 12 hours thereby obtaining a negative electrode body for the test. Then, a separator formed of polyethylene was impregnated with the electrolytic solution thereby assembling 50 mAh cell provided with an aluminum laminate outer covering.

By using the cell produced by the above-discussed method, the charging and discharging test was carried out at a circumstance temperature of 60° C. Both charging and discharging were made at a current density of 0.35 $mA/cm^2$, in which a charging and discharging cycle was repeated, the cycle including a charging of maintaining 4.2 V for 1 hour after reaching to 4.2 V, and a discharging to 3.0 V. Then, the state of deterioration of the cell was evaluated by a discharge capacity maintaining rate after 500 cycles and by a cell resistance value at room temperature after 500 cycles. The capacity maintaining rate is represented by a percentage of the discharge capacity after 500 cycles relative to the initial discharge capacity. Results are shown in Table 1, in which the capacity maintaining rate after cycles represented by a percentage of the discharge capacity after 500 cycles relative to the initial discharge capacity was 91%, and the resistance value after cycles represented by the cell resistance value at room temperature after 500 cycles was 7Ω.

EXAMPLE 6

A charge and discharge test was carried out similarly to the above Example 5 with the exception that the compound of the general formula (1) was $LiBF(PO_2F_2)_3$, and the added concentration thereof was 0.01 mass %. Results are shown in Table 1, in which the capacity maintaining rate after cycles represented by a percentage of the discharge capacity after 500 cycles relative to the initial discharge capacity was 73%, and the resistance value after cycles represented by the cell resistance value at room temperature after 500 cycles was 15Ω.

EXAMPLE 7

A charge and discharge test was carried out similarly to the above Example 5 with the exception that the compound of the general formula (1) was $LiPF_5(PO_2F_2)$, and the added concentration thereof was 10.0 mass %. Results are shown in Table 1, in which the capacity maintaining rate after cycles represented by a percentage of the discharge capacity after 500 cycles relative to the initial discharge capacity was 94%, and the resistance value after cycles represented by the cell resistance value at room temperature after 500 cycles was 12Ω.

EXAMPLE 8

A charge and discharge test was carried out similarly to the above Example 5 with the exception that the compound of the general formula (1) was $LiBF_2(PO_2F_2)_2$, and the added concentration thereof was 1.0 mass %. Results are shown in Table 1, in which the capacity maintaining rate after cycles represented by a percentage of the discharge capacity after 500 cycles relative to the initial discharge capacity was 92%, and the resistance value after cycles represented by the cell resistance value at room temperature after 500 cycles was 8Ω.

EXAMPLE 9

A charge and discharge test was carried out similarly to the above Example 5 with the exception that the compound of the general formula (1) was $LiB(PO_2F_2)_4$, and the added concentration thereof was 2.0 mass %. Results are shown in Table 1, in which the capacity maintaining rate after cycles represented by a percentage of the discharge capacity after 500 cycles relative to the initial discharge capacity was 88%, and the resistance value after cycles represented by the cell resistance value at room temperature after 500 cycles was 12Ω.

EXAMPLE 10

A charge and discharge test was carried out similarly to the above Example 5 with the exception that the compound of the general formula (1) was $LiPF_4(PO_2F_2)_2$, and the added concentration thereof was 2.0 mass %. Results are shown in Table 1, in which the capacity maintaining rate after cycles represented by a percentage of the discharge capacity after 500 cycles relative to the initial discharge capacity was 90%, and the resistance value after cycles represented by the cell resistance value at room temperature after 500 cycles was 9Ω.

EXAMPLE 11

A charge and discharge test was carried out similarly to the above Example 5 with the exception that the compound of the general formula (1) was $LiPF_3(PO_2F_2)_3$, and the added concentration thereof was 2.0 mass %. Results are shown in Table 1, in which the capacity maintaining rate after cycles represented by a percentage of the discharge capacity after 500 cycles relative to the initial discharge capacity was 93%, and the resistance value after cycles represented by the cell resistance value at room temperature after 500 cycles was 10Ω.

EXAMPLE 12

A charge and discharge test was carried out similarly to the above Example 5 with the exception that the compound of the general formula (1) was $LiPF(PO_2F_2)_5$, and the added concentration thereof was 2.0 mass %. Results are shown in Table 1, in which the capacity maintaining rate after cycles represented by a percentage of the discharge capacity after 500 cycles relative to the initial discharge capacity was 85%, and the resistance value after cycles represented by the cell resistance value at room temperature after 500 cycles was 7Ω.

EXAMPLE 13

A charge and discharge test was carried out similarly to the above Example 5 with the exception that the compound of the general formula (1) was $LiB(C_6F_5)_3(PO_2F_2)$, and the added concentration thereof was 2.0 mass %. Results are shown in Table 1, in which the capacity maintaining rate after cycles represented by a percentage of the discharge capacity after 500 cycles relative to the initial discharge capacity was 94%, and the resistance value after cycles represented by the cell resistance value at room temperature after 500 cycles was 6Ω.

EXAMPLE 14

A charge and discharge test was carried out similarly to the above Example 5 with the exception that the compound of the general formula (1) was $LiB(C_6H_5)_3(PO_2F_2)$, and the added concentration thereof was 2.0 mass %. Results are shown in Table 1, in which the capacity maintaining rate after cycles represented by a percentage of the discharge capacity after 500 cycles relative to the initial discharge capacity was 84%, and the resistance value after cycles represented by the cell resistance value at room temperature after 500 cycles was 18Ω.

EXAMPLE 15

A charge and discharge test was carried out similarly to the above Example 5 with the exception that the compound of the general formula (1) was $LiB(CF_3)_3(PO_2F_2)$, and the added concentration thereof was 2.0 mass %. Results are shown in Table 1, in which the capacity maintaining rate after cycles represented by a percentage of the discharge capacity after 500 cycles relative to the initial discharge capacity was 87%, and the resistance value after cycles represented by the cell resistance value at room temperature after 500 cycles was 8Ω.

EXAMPLE 16

A charge and discharge test was carried out similarly to the above Example 5 with the exception that the compound of the general formula (1) was $KBF_3(PO_2F_2)$; the solute was $LiBF_4$; and the solvent was a mixture solvent of ethylene carbonate, propylene carbonate, dimethyl carbonate and diethyl carbonate in a volume ratio of 1:1:1:1. Results are shown in Table 1, in which the capacity maintaining rate after cycles represented by a percentage of the discharge capacity after 500 cycles relative to the initial discharge capacity was 82%, and the resistance value after cycles represented by the cell resistance value at room temperature after 500 cycles was 17Ω.

EXAMPLE 17

A charge and discharge test was carried out similarly to the above Example 5 with the exception that the compound of the general formula (1) was $NaBF_3(PO_2F_2)$, and the solvent was a mixture solvent of ethylene carbonate, propylene carbonate, dimethyl carbonate and diethyl carbonate in a volume ratio of 1:1:1:1. Results are shown in Table 1, in which the capacity maintaining rate after cycles represented by a percentage of the discharge capacity after 500 cycles relative to the initial discharge capacity was 85%, and the resistance value after cycles represented by the cell resistance value at room temperature after 500 cycles was 12Ω.

EXAMPLE 18

A charge and discharge test was carried out similarly to the above Example 5 with the exception that the compound of the general formula (1) was $(C_2H_5)_4NBF_3(PO_2F_2)$, and the solvent was a mixture solvent of ethylene carbonate, propylene carbonate, dimethyl carbonate and diethyl carbonate in a volume ratio of 1:1:1:1. Results are shown in Table 1, in which the capacity maintaining rate after cycles represented by a percentage of the discharge capacity after 500 cycles relative to the initial discharge capacity was 90%, and the resistance value after cycles represented by the cell resistance value at room temperature after 500 cycles was 10Ω.

COMPARATIVE EXAMPLE 1

An electrolytic solution having a concentration of 1.0 mol/L was prepared by using $LiPF_6$ as an electrolyte. At this time, a mixture solvent (EC:EMC=1:2) of ethylene carbonate (EC) and ethylmethyl carbonate (EMC) was used as a solvent.

By using this electrolytic solution, a cell was produced by using $LiCoO_2$ as a positive electrolyte material while by using graphite as a negative electrolyte material, similarly to Example 2 The cell actually underwent a charge and discharge test for a battery.

By using the cell produced by the above-discussed method, the charging and discharging test was carried out at a circumstance temperature of 25° C. Both charging and discharging were made at a current density of 0.35 mA/cm², in which a charging and discharging cycle was repeated, the cycle including a charging of maintaining 4.2 V for 1 hour after reaching to 4.2 V, and a discharging to 3.0 V. An initial discharge capacity was 340 mAh/g in mass standard of the negative electrode. A discharge capacity maintaining rate after 500 cycles was 71%, the discharge capacity maintaining rate being represented by a percentage of the discharge capacity after 500 cycles relative to the initial discharge capacity.

COMPARATIVE EXAMPLE 2

An electrolytic solution having a concentration of 1.0 mol/L was prepared by using $LiBF_4$ as an electrolyte. At this time, a mixture solvent (EC:EMC=1:2) of ethylene carbonate (EC) and ethylmethyl carbonate (EMC) was used as a solvent.

By using this electrolytic solution, a cell was produced by using $LiCoO_2$ as a positive electrolyte material while by using graphite as a negative electrolyte material, similarly to Example 2 The cell actually underwent a charge and discharge test for a battery.

By using the cell produced by the above-discussed method, the charging and discharging test was carried out at a circumstance temperature of 25° C. Both charging and discharging were made at a current density of 0.35 mA/cm², in which a charging and discharging cycle was repeated, the cycle including a charging of maintaining 4.2 V for 1 hour after reaching to 4.2 V, and a discharging to 3.0 V. An initial discharge capacity was 310 mAh/g in mass standard of the negative electrode. A discharge capacity maintaining rate after 500 cycles was 50%, the discharge capacity maintaining rate being represented by a percentage of the discharge capacity after 500 cycles relative to the initial discharge capacity.

COMPARATIVE EXAMPLE 3

An electrolytic solution having a concentration of 1.0 mol/L was prepared by using $LiN(SO_2CF_3)_2$ as an electrolyte. At this time, a mixture solvent (EC:EMC=1:2) of ethylene carbonate (EC) and ethylmethyl carbonate (EMC) was used as a solvent.

By using this electrolytic solution, a cell was produced by using $LiCoO_2$ as a positive electrolyte material while by using graphite as a negative electrolyte material, similarly to Example 2. The cell actually underwent a charge and discharge test for a battery.

By using the cell produced by the above-discussed method, the charging and discharging test was carried out at the circumstance temperature of 25° C. Both charging and discharging were made at a current density of 0.35 mA/cm², in which a charging and discharging cycle was repeated, the cycle including a charging of maintaining 4.2 V for 1 hour after reaching to 4.2 V, and a discharging to 3.0 V. An initial discharge capacity was 280 mAh/g in mass standard of the negative electrode. A discharge capacity maintaining rate after 500 cycles was 23%, the discharge capacity maintaining rate being represented by a percentage of the discharge capacity after 500 cycles relative to the initial discharge capacity.

COMPARATIVE EXAMPLE 4

A charge and discharge test was carried out similarly to the above Example 5 with the exception that the compound of the general formula (1) was not used. Results are shown in Table 1, in which the capacity maintaining rate after cycles represented by a percentage of the discharge capacity after 500 cycles relative to the initial discharge capacity was 41%, and the resistance value after cycles represented by the cell resistance value at room temperature after 500 cycles was 36Ω.

COMPARATIVE EXAMPLE 5

A charge and discharge test was carried out similarly to the above Example 16 with the exception that the compound of the general formula (1) was not used. Results are shown in Table 1, in which the capacity maintaining rate after cycles represented by a percentage of the discharge capacity after 500 cycles relative to the initial discharge capacity was 30%, and the resistance value after cycles represented by the cell resistance value at room temperature after 500 cycles was 52Ω.

COMPARATIVE EXAMPLE 6

A charge and discharge test was carried out similarly to the above Example 17 with the exception that the compound of the general formula (1) was not used. Results are shown in Table 1, in which the capacity maintaining rate after cycles represented by a percentage of the discharge capacity after 500 cycles relative to the initial discharge capacity was 38%, and the resistance value after cycles represented by the cell resistance value at room temperature after 500 cycles was 40Ω.

Results of the above Examples 5 to 18 and Comparative Examples 4 to 6 are shown in Table 1.

TABLE 1

| | Solute | Solvent (vol. ratio) | Concentration of compound of general formula (1) (mass %) | Capacity maintaining after cycles (%) | Resistance after cycles (Ω) |
|---|---|---|---|---|---|
| Example 5 | $LiPF_6$ | EC + EMC (1:2 vol.) | $LiBF_3(PO_2F_2)$ 3 | 91 | 7 |
| Example 6 | $LiPF_6$ | EC + EMC (1:2 vol.) | $LiBF(PO_2F_2)_3$ 0.01 | 73 | 12 |
| Example 7 | $LiPF_6$ | EC + EMC (1:2 vol.) | $LiPF_5(PO_2F_2)$ 10 | 94 | 15 |
| Example 8 | $LiPF_6$ | EC + EMC (1:2 vol.) | $LiBF_2(PO_2F_2)_2$ 1 | 92 | 8 |
| Example 9 | $LiPF_6$ | EC + EMC (1:2 vol.) | $LiB(PO_2F_2)_4$ 2 | 88 | 12 |
| Example 10 | $LiPF_6$ | EC + EMC (1:2 vol.) | $LiPF_4(PO_2F_2)_2$ 2 | 90 | 9 |
| Example 11 | $LiPF_6$ | EC + EMC (1:2 vol.) | $LiPF_3(PO_2F_2)_3$ 2 | 93 | 10 |
| Example 12 | $LiPF_6$ | EC + EMC (1:2 vol.) | $LiPF(PO_2F_2)_5$ 2 | 85 | 7 |
| Example 13 | $LiPF_6$ | EC + EMC (1:2 vol.) | $LiB(C_6F_5)_3(PO_2F_2)$ 2 | 94 | 6 |
| Example 14 | $LiPF_6$ | EC + EMC (1:2 vol.) | $LiB(C_6H_5)_3(PO_2F_2)$ 2 | 84 | 18 |
| Example 15 | $LiPF_6$ | EC + EMC (1:2 vol.) | $LiB(CF_3)_3(PO_2F_2)$ 2 | 87 | 8 |
| Example 16 | $LiBF_4$ | EC + PC + DMC + DEC (1:1:1:1 vol.) | $KBF_3(PO_2F_2)$ 3 | 82 | 17 |
| Example 17 | $LiPF_6$ | EC + PC + DMC + DEC (1:1:1:1 vol.) | $NaBF_3(PO_2F_2)$ 3 | 85 | 12 |
| Example 18 | $LiPF_6$ | EC + PC + DMC + DEC (1:1:1:1 vol.) | $(C_2H_5)_4NBF_3(PO_2F_2)$ 3 | 90 | 10 |
| Comparative example 4 | $LiPF_6$ | EC + EMC (1:2 vol.) | — 0 | 41 | 36 |
| Comparative example 5 | $LiBF_4$ | EC + PC + DMC + DEC (1:1:1:1 vol.) | — 0 | 30 | 52 |
| Comparative example 6 | $LiPF_6$ | EC + PC + DMC + DEC (1:1:1:1 vol.) | — 0 | 38 | 40 |

INDUSTRIAL USABILITY

The electrolyte for an electrochemical device, according to the present invention can be used as the electrolyte for an electrochemical device such as a lithium battery, a lithium ion battery, or an electric double layer capacitor, particularly be useful for the electrolytic solution for a nonaqueous electrolyte battery. Examples of other applications of it include a catalyst for organic synthesis reactions, a polymerization catalyst for polymers, a co-catalyst for olefin polymerization, and the like.

The invention claimed is:

1. An electrolyte for an electrochemical device, said electrolyte having a chemical structure formula represented by a general formula (1),

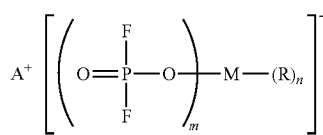
(1)

where M is P;
$A^+$ is $Li^+$;
m is a number of 1-6;
n is a number of 0-5;
R is each independently a halogen atom, a $C_1$-$C_{10}$ halogenated alkyl group, a $C_6$-$C_{20}$ aryl group or a $C_6$-$C_{20}$ halogenated aryl group;
a hydrogen atom in R may be replaced with a halogen atom, a chain or cyclic alkyl group, an aryl group, an alkenyl group, an alkoxy group, an aryloxy group, a sulfonyl group, an amino group, a cyano group, a carbonyl group, an acyl group, an amide group or a hydroxyl group; and
a carbon atom in R may be replaced by a nitrogen atom, a sulfur atom or an oxygen atom.

2. An electrolyte for an electrochemical device as claimed in claim 1, wherein R is a fluorine atom, a phenyl group or a pentafluorophenyl group.

3. An electrolyte for an electrochemical device as claimed in claim 1, wherein an anion section in the general formula (1) is one selected from the group consisting of $[PF_5(PO_2F_2)]^-$, $[PF_4(PO_2F_2)_2]^-$, $[PF_3(PO_2F_2)_3]^-$, $[PF_2(PO_2F_2)_4]^-$, $[PF(PO_2F_2)_5]^-$ and $[P(PO_2F_2)_6]^-$.

4. An electrolyte for an electrochemical device, said electrolyte having a chemical structure formula represented by a general formula (1),

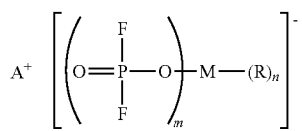
(1)

where
M is B or P;
$A^+$ is an alkali metal ion or an onium ion;
m is a number of 1-4 when M is B, and is a number of 2-5 when M is P;
n is a number of 0-3 when M is B, and is a number of 1-4 when M is P;
R is each independently a halogen atom, a $C_1$-$C_{10}$ halogenated alkyl group, a $C_6$-$C_{20}$ aryl group, or a $C_6$-$C_{20}$ halogenated aryl group;
a hydrogen atom in R may be replaced with a halogen atom, a chain or cyclic alkyl group, an aryl group, an alkenyl group, an alkoxy group, an aryloxy group, a sulfonyl group, an amino group, a cyano group, a carbonyl group, an acyl group, an amide group or a hydroxyl group; and
a carbon atom in R may be replaced by a nitrogen atom, a sulfur atom or an oxygen atom.

5. An electrolyte for an electrochemical device as claimed in claim 4, wherein $A^+$ is a cation selected from the group consisting of a Li ion, a Na ion, a K ion and a quaternary alkylammonium ion.

6. An electrolyte for an electrochemical device as claimed in claim 4, wherein R is a fluorine atom, a phenyl group or a pentafluorophenyl group.

7. An electrolyte for an electrochemical device as claimed in claim 4, wherein an anion section in the general formula (1) is one selected from the group consisting of $[BF_3(PO_2F_2)]^-$, $[BF_2(PO_2F_2)_2]^-$, $[BF(PO_2F_2)_3]^-$, $[B(PO_2F_2)_4]^-$, $[PF_4(PO_2F_2)_2]^-$, $[PF_3(PO_2F_2)_3]^-$, $[PF_2(PO_2F_2)_4]^-$, $[PF(PO_2F_2)_5]^-$, $[B(C_6H_5)_3(PO_2F_2)]^-$ and $[B(C_6F_5)_3(PO_2F_2)]^-$.

8. An electrolytic solution for a nonaqueous electrolyte battery comprising:
a nonaqueous organic solvent; and
an electrolyte having a chemical structure formula represented by a general formula (1),

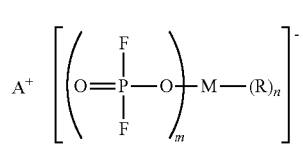
(1)

where M is a group 13 or 15 element of the periodic table;
$A^+$ is an alkali metal ion or an onium ion;
m is a number of 1-4 when M is a group 13 element, and is a number of 1-6 when M is a group 15 element;
n is a number of 0-3 when M is a group 13 element, and is a number of 0-5 when M is a group 15 element;
R is each independently a halogen atom, a $C_1$-$C_{10}$ halogenated alkyl group, a $C_6$-$C_{20}$ aryl group or a $C_6$-$C_{20}$ halogenated aryl group;
a hydrogen atom in R may be replaced with a halogen atom, a chain or cyclic alkyl group, an aryl group, an alkenyl group, an alkoxy group, an aryloxy group, a sulfonyl group, an amino group, a cyano group, a carbonyl group, an acyl group, an amide group or a hydroxyl group; and
a carbon atom in R may be replaced by a nitrogen atom, a sulfur atom or an oxygen atom.

9. An electrolytic solution for a nonaqueous electrolyte battery as claimed in claim 8, wherein the nonaqueous organic solvent is at least one selected from the group consisting of ethylene carbonate, propylene carbonate, diethyl carbonate, dimethyl carbonate and ethylmethyl carbonate.

10. An electrolytic solution for a nonaqueous electrolyte battery as claimed in claim 8, wherein the electrolyte is present at a concentration within a range between 0.01 and 10.0 mass %.

11. An electrolytic solution for a nonaqueous electrolyte battery as claimed in claim 8, wherein M is either B or P.

12. An electrolytic solution for a nonaqueous electrolyte battery as claimed in claim 8, wherein $A^+$ is a cation selected from the group consisting of a Li ion, a Na ion, a K ion and a quaternary alkylammonium ion.

13. An electrolytic solution for a nonaqueous electrolyte battery as claimed in claim 8, wherein R is a fluorine atom, a phenyl group or a pentafluorophenyl group.

14. An electrolytic solution for a nonaqueous electrolyte battery as claimed in claim 8, wherein an anion section in the general formula (1) is one selected from the group consisting of $[BF_3(PO_2F_2)]^-$, $[BF_2(PO_2F_2)_2]^-$, $[BF(PO_2F_2)_3]^-$, $[B(PO_2F_2)_4]^-$, $[PF_5(PO_2F_2)]^-$, $[PF_4(PO_2F_2)_2]^-$, $[PF_3(PO_2F_2)_3]^-$, $[PF_2(PO_2F_2)_4]^-$, $[PF(PO_2F_2)_5]^-$, $[P(PO_2F_2)_6]^-$, $[B(C_6H_5)_3(PO_2F_2)]^-$ and $[B(C_6F_5)_3(PO_2F_2)]^-$.

15. An electrolytic solution for a nonaqueous electrolyte battery as claimed in claim 8, further comprising a solute, wherein an additive includes the electrolyte.

16. An electrolytic solution for a nonaqueous electrolyte battery as claimed in claim 15, wherein the solute is $LiPF_6$, $LiBF_4$, $(CF_3SO_2)_2NLi$ or $(C_2F_5SO_2)_2NLi$.

17. An electrolytic solution for a nonaqueous electrolyte battery as claimed in claim 15, wherein the nonaqueous organic solvent is at least one selected from the group consisting of ethylene carbonate, propylene carbonate, diethyl carbonate, dimethyl carbonate and ethylmethyl carbonate.

18. An electrolytic solution for a nonaqueous electrolyte battery as claimed in claim 15, wherein the electrolyte is present at a concentration within a range between 0.01 and 10.0 mass %.

19. An electrolytic solution for a nonaqueous electrolyte battery as claimed in claim 15, wherein M is either B or P.

20. An electrolytic solution for a nonaqueous electrolyte battery as claimed in claim 15, wherein $A^+$ is a cation selected from the group consisting of a Li ion, a Na ion, a K ion and a quaternary alkylammonium ion.

21. An electrolytic solution for a nonaqueous electrolyte battery as claimed in claim 15, wherein R is a fluorine atom, a phenyl group or a pentafluorophenyl group.

22. An electrolytic solution for a nonaqueous electrolyte battery as claimed in claim 15, wherein an anion section in the general formula (1) is one selected from the group consisting of $[BF_3(PO_2F_2)]^-$, $[BF_2(PO_2F_2)_2]^-$, $[BF(PO_2F_2)_3]^-$, $[B(PO_2F_2)_4]^-$, $[PF_5(PO_2F_2)]^-$, $[PF_4(PO_2F_2)_2]^-$, $[PF_3(PO_2F_2)_3]^-$, $[PF_2(PO_2F_2)_4]^-$, $[PF(PO_2F_2)_5]^-$, $[P(PO_2F_2)_6]^-$, $[B(C_6H_5)_3(PO_2F_2)]^-$ and $[B(C_6F_5)_3(PO_2F_2)]^-$.

23. A nonaqueous electrolyte battery including at least a positive electrode, a negative electrode formed of lithium or of a negative electrode material which occludes or releases lithium, and an electrolytic solution as claimed in claim 8.

24. A nonaqueous electrolyte battery including at least a positive electrode, a negative electrode formed of lithium or of a negative electrode material which occludes or releases lithium, and an electrolytic solution as claimed in claim 15.

* * * * *